United States Patent [19]

Blackmon et al.

[11] Patent Number: 6,118,428

[45] Date of Patent: Sep. 12, 2000

[54] METHOD AND SYSTEM FOR SIMULTANEOUS PRESENTATION OF MULTIPLE WINDOWS SUPPORTED BY DIFFERENT GRAPHIC USER INTERFACES

[75] Inventors: John Monroe Blackmon; Barry Alan Feigenbaum; Mark Allen Fiechtner, all of Boca Raton, Fla.; Jeffrey Thomas Galea, Clifton, Va.; Allen Moses Gilbert; David Andrews Kerr, both of Boca Raton, Fla.; Paul R. King, Delray Beach, Fla.; Tatchi Placido Lay, Boca Raton, Fla.; Ivan Lomelli, Boynton Beach, Fla.; Darren Mark Miclette, Delray Beach, Fla.; Colin Victor Powell, Highland Beach, Fla.; Glenn Thomas Puchtel, Boca Raton, Fla.; Jonathan Mark Wagner, Coral Springs, Fla.

[73] Assignee: International Business Machines Corporation, Armonk, N.Y.

[21] Appl. No.: 08/156,951

[22] Filed: Nov. 15, 1993

Related U.S. Application Data

[63] Continuation of application No. 07/860,826, Mar. 31, 1992, abandoned.

[51] Int. Cl.[7] .................................................... G09G 5/00
[52] U.S. Cl. ......................... 345/115; 345/340; 345/342
[58] Field of Search ............................. 345/1, 4, 7, 115, 345/116, 724, 326, 329, 339, 340, 341, 342, 343; 395/153, 154, 157

[56] References Cited

U.S. PATENT DOCUMENTS

| | | | |
|---|---|---|---|
| 4,574,364 | 3/1986 | Tabata et al. | 395/157 |
| 4,903,218 | 2/1990 | Longo et al. | 395/157 |
| 4,939,507 | 7/1990 | Beard et al. | 340/706 |
| 4,974,196 | 11/1990 | Iwami et al. | 395/157 |
| 5,062,060 | 10/1991 | Kolnick | 395/157 |
| 5,121,478 | 6/1992 | Rao | 395/157 |

*Primary Examiner*—Dennis-Doon Chow
*Attorney, Agent, or Firm*—Andrew J. Dillon

[57] ABSTRACT

A method and system are disclosed which may be utilized to generate a simultaneous presentation within a data processing system of video data within multiple windows supported by different graphic user interfaces. Each graphic user interface is coupled to a separate display device driver. Window movements including: creation; deletion; resizing; movement; minimization; maximization; activation; enablement; or an alteration in relative background/foreground order are detected for each graphic user interface and that information and the associated display device driver for each graphic user interface are coupled to a virtual device driver which facilitates interprocess communication between two or more graphic user interfaces, wherein the portion of the video display which is managed by each graphic user interface may be ascertained. Each separate display device driver is then coupled to a single display device, wherein multiple windows supported by different graphic user interfaces may be simultaneously presented.

6 Claims, 3 Drawing Sheets

METHOD AND SYSTEM FOR SIMULTANEOUS PRESENTATION OF MULTIPLE WINDOWS SUPPORTED BY DIFFERENT GRAPHIC USER INTERFACES

This is a continuation, of application Ser. No. 07/860,826, filed Mar. 31, 1992 now abandoned.

BACKGROUND OF THE INVENTION

1. Technical Field

The present invention relates in general to improvements in data processing systems, and in particular to improvements in the presentation of video data within multiple windows in a data processing system. Still more particularly, the present invention relates to an improved method and system for simultaneously presenting video data in a data processing system within multiple windows supported by different graphic user interfaces.

2. Description of the Related Art

The increasing complexity of modern personal computer systems has substantially increased the complexity of the user interface to such systems. In an effort to permit users to access such complex systems, developers have recently begun to provide enhanced interfaces, known as "graphic user interfaces" or "GUIs." A graphic user interface provides a graphical, intuitive interface to a complex data processing system which permits a user to graphically select depicted objects and manipulate applications corresponding to those objects. Further, multiple applications may be simultaneously invoked and operated in a plurality of viewports or windows which are displayed in an electronic analog of a physical desk top. These applications may be easily manipulated utilizing a standard set of interface commands and they are shrunk down to a so-called "icon," closed, moved or rearranged in relative background/foreground position.

Several examples of such graphic user interfaces are known in the prior art. Presentation Manager by International Business Machines Corporation is an excellent example of a graphic user interface which may be utilized with a large number of applications. Windows 3.0 by Microsoft Corporation is another example of a graphic user interface. Generally, known graphic user interfaces are most efficient when utilized in conjunction with an application which has been designed to take full advantage of the features of a specific graphic user interface. However, most graphic user interfaces may be utilized to run a so-called "DOS" application which is not designed to operate with a specific graphic user interface. This is accomplished by operating the application utilizing a Virtual DOS Machine (VDM) and displaying the application in either a full screen display or within a special window. A major disadvantage to this type of application is the failure of such applications to take full advantage of the graphical nature of a graphic user interface.

While the aforementioned graphic user interfaces provide an excellent interface for operating applications designed to be utilized therein, many sophisticated computer users desire to operate multiple applications which may be supported by different graphic user interfaces. Utilizing known graphic user interface technology, a user desiring to utilizing an application supported by a different graphic user interface must terminate operations within the present graphic user interface and initiate operations within the second graphic user interface. It should therefore be apparent that a need exists for a method and system which would permit the simultaneous presentation of multiple windows supported by different graphic user interfaces.

SUMMARY OF THE INVENTION

It is therefore one object of the present invention to provide an improved data processing system.

It is another object of the present invention to provide an improved presentation of video data within multiple windows in a data processing system.

It is yet another object of the present invention to provide an improved method and system for simultaneously presenting video data in a data processing system within multiple windows supported by different graphic user interfaces.

The foregoing objects are achieved as is now described. The method and system of the present invention may be utilized to generate a simultaneous presentation within a data processing system of video data within multiple windows supported by different graphic user interfaces. Each graphic user interface is coupled to a separate display device driver. Window movements including: creation; deletion; resizing; movement; minimization; maximization; activation; enablement; or an alteration in relative background/foreground order are detected for each graphic user interface and that information and the associated display device driver for each graphic user interface are coupled to a virtual device driver which facilitates interprocess communication between two or more graphic user interfaces, wherein the portion of the video display which is managed by each graphic user interface may be ascertained. Each separate display device driver is then coupled to a single display device, wherein multiple windows supported by different graphic user interfaces may be simultaneously presented.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
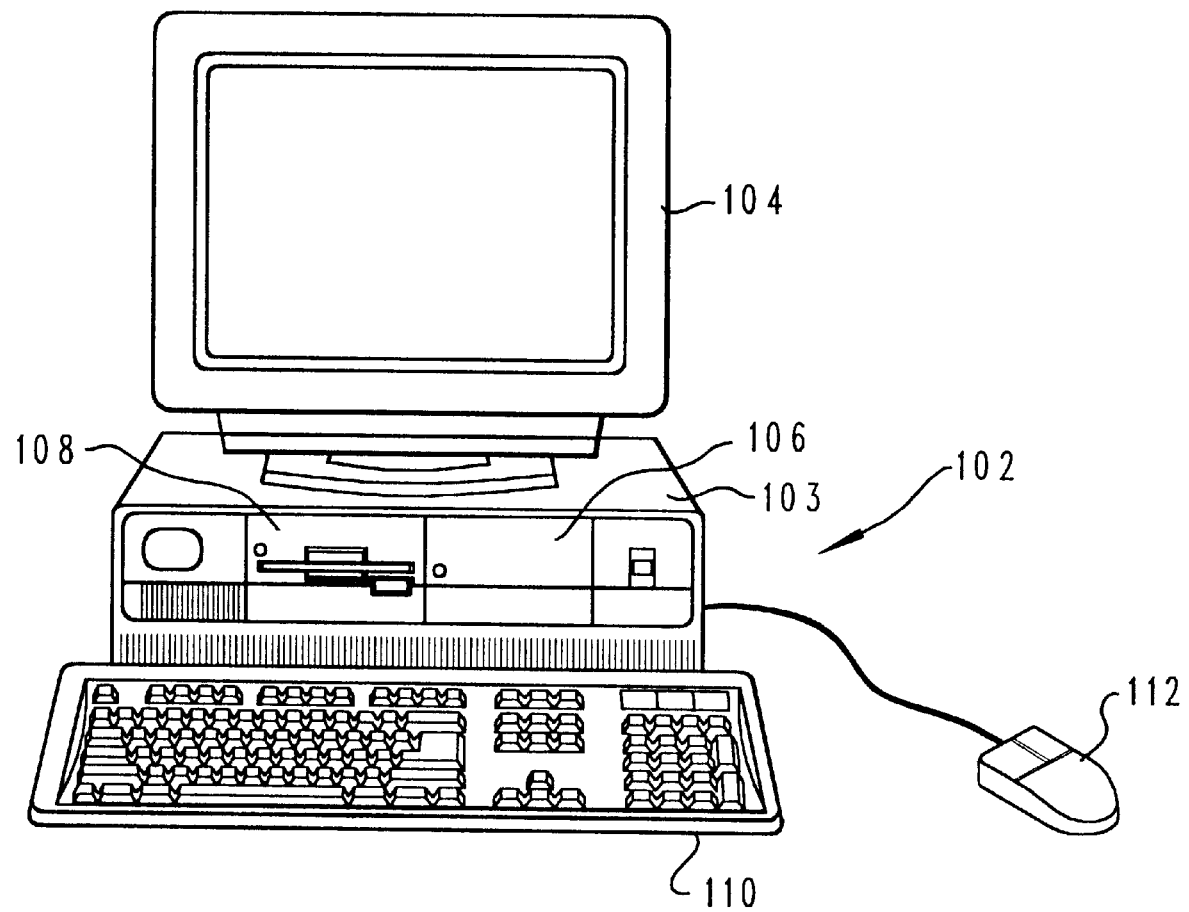
FIG. 1 is a pictorial representation of a computer which may be utilized to implement the method and system of the present invention.

With reference now to the figures and in particular with reference to FIG. 1, there is depicted a pictorial representation of a computer 102 which may be utilized to implement the method and system of the present invention. As illustrated, computer 102 preferably includes a video display 104 and a keyboard 110, coupled in a manner well known in the prior art. Additionally, computer 102 preferably includes a processor case 103 which may serve to mount a fixed disk drive 106 and a diskette drive 108 in addition to the main processor and solid-state memory devices (not shown). Further, in order to facilitate the utilization of a graphic user interface, computer 102 preferably includes a graphic pointing device, such as a mouse 112, which may be utilized to manipulate the position of a cursor (not shown) within video display 104. Those skilled in the art will appreciate that computer 102 may be implemented utilizing any state-ofthe-art personal computer, such as the PS/2 Model 80 Personal Computer manufactured by International Business Machines Corporation.

Figure 2:
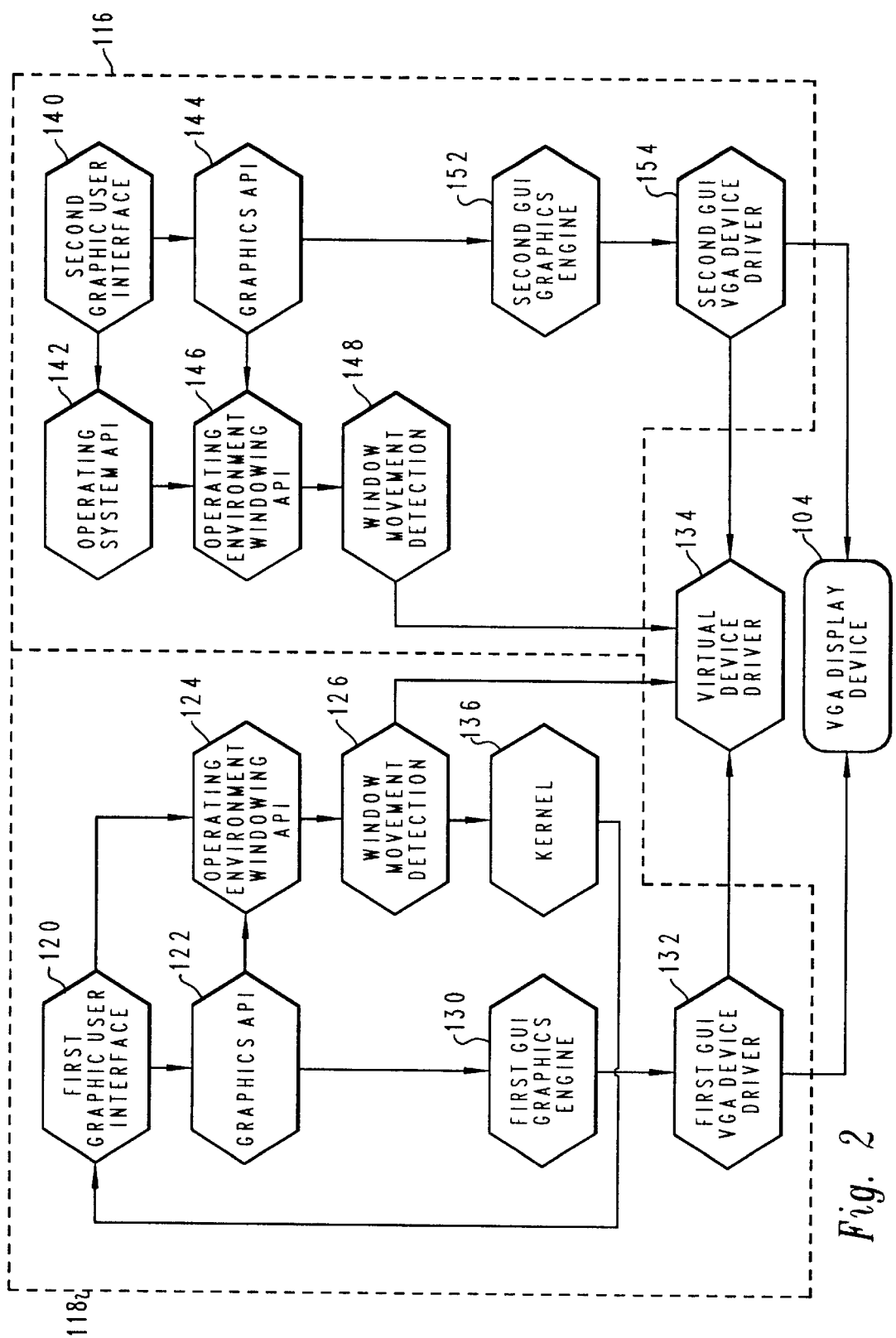
FIG. 2 is a logic flow diagram of one implementation of the method and system of the present invention.

Referring now to FIG. 2, there is depicted a logic flow diagram of one implementation of the method and system of the present invention. As illustrated, the logic flow diagram of FIG. 2 is divided into a first session 118 and a second session 116. For purposes of explanation, two different graphic user interface sessions are depicted, a first graphic user interface 120, preferably a Windows session, and a second graphic user interface 140, such as a Presentation Manager session. In the depicted embodiment of the present invention, first graphic user interface 120 is preferably operated within a Virtual DOS Machine (VDM) which is created within computer 102 (see FIG. 1). In the past, a request to run an application within a VDM must have originated within that VDM. Any new request for application which was initiated outside the VDM would result in the creation of a new VDM; however, the method and system of the present invention permits multiple applications to be run within a single VDM, from requests which originate external to the VDM.

This ability to run multiple applications within a single VDM arises as a result of operating within an operating system Application Program Interface (API) 142. When API 142 receives a request to initiate an application in first session 118, that request is passed through operating system environment API 146 and routed to window movement detection module 148. This request is then utilized to create first session 118 and a VDM is created. If a VDM specified for utilization within session 118 is already running, the request is routed to session 118 via window movement detection module 148, virtual device driver 134 and window movement detection module 126. Window movement detection module 126 will then make an API call to kernel 136 which initiates a new task within session 118. In this manner multiple graphic user interface applications may be initiated within a single VDM by requests which are initiated external to the VDM. Those skilled in the art will appreciate that this technique may also be utilized to initiate an application in session 116 as a result of a request coming from session 118.

Still referring to FIG. 2, it may be seen that multiple applications may be run within two graphic user interfaces by initiating one of the graphic user interfaces within a VDM in the manner depicted. Each graphic user interface is preferably coupled to a graphics API 122 or 144. Those skilled in the art will appreciate that if first graphic user interface 120 comprises a Windows interface, graphics API 122 will comprise the known GDI API. Similarly, if second graphic user interface 140 comprises a Presentation Manager interface, then graphics API 144 will comprise the known GPI API. As is known in these API's, each graphics API is preferably coupled to an operating environment windowing API, such as operating environment windowing API 124 or 146. As noted above, if first user interface 120 comprises a Windows interface, then operating environment windowing API 124 may be implemented as the USER.EXE windowing interface provided in conjunction with the Windows interface. Similarly, operating environment windowing API 146 may be implemented utilizing PMWIN, the Presentation Manager windowing API.

In order to implement the method and system of the present invention, both operating environment windowing API 124 and operating environment windowing API 146 will require certain minor modifications to the standard API as described above. Specifically, the implementation of each operating environment windowing API will have added thereto certain so-called "hooks" or identifiable software elements which are inserted into the software within these operating environment windowing API's to permit pre and post notifications to be generated each time a window movement takes place. For purposes of this explanation, a "window movement" comprises any significant event with regard to a window within either graphic user interface such as: the creation of a window; the deletion of a window; the size change of a window; the movement of a window; the minimization of a window; the maximization of a window; the activation of a window; the enablement of a window; or a change in relative background/foreground position of certain windows.

In this manner, window movement detection modules 126 and 148 may be notified of impending or completed window movements such that presentation of multiple windows supported by different graphic user interfaces may be displayed. Further, at initialization each window movement detection module (126 and 148) requests the coordinates and size of each window and icon within the other session via a virtual device driver 134 which is utilized to allow inter-process communication. This information is utilized within each session to maintain a representation of each object within other sessions and to generate so-called "clipping regions" for each session which may be "painted" utilizing an associated VGA device driver 132 and 154.

Referring again to graphics API 122 and 144, the outputs thereof are applied to graphics engines 130 and 152, in a manner well known in the art, in order to generate graphic data which is coupled to an associated VGA device driver 132 and 154. As described above, "clipping regions" established within each session are then utilized to permit multiple device drivers to share a single display device 104.

In operation, when window movement detection module 126 receives a pre-notification of a window movement, it disables the ability of first session 118 to "paint" to video display device 104, via virtual display driver 134 and VGA device driver 132. After the movement occurs, the results of that movement are coupled to window movement detection module 148, via virtual device driver 134 and an identical change is made to the "clipping regions" maintained by graphics user interface 140. After this change is made, both graphic user interfaces are permitted to paint the video display screen within their associated clipping regions. Alternately, a prenotification of a window movement within session 116 is detected at window movement detection module 148 and a similar operation occurs. In this manner, the presentation of multiple windows supported by different graphic user interfaces is synchronized without actually stopping processing by the simple expedient of disallowing the painting of windows while any window is in a state of change, and repainting each window after completion of the change.

Cursor manipulation is also controlled utilizing this clipping region technique. "Hooks" are placed within the implementation of operating environment windowing API 124 for all cursor manipulations. Thus, cursor bit maps may be passed to window movement detection module 148 for conversion to a cursor bit map which is utilizable by session 116. Thus, in the depicted embodiment of the present invention, only session 116 will paint a cursor within the method and system of the present invention.

Figure 3:
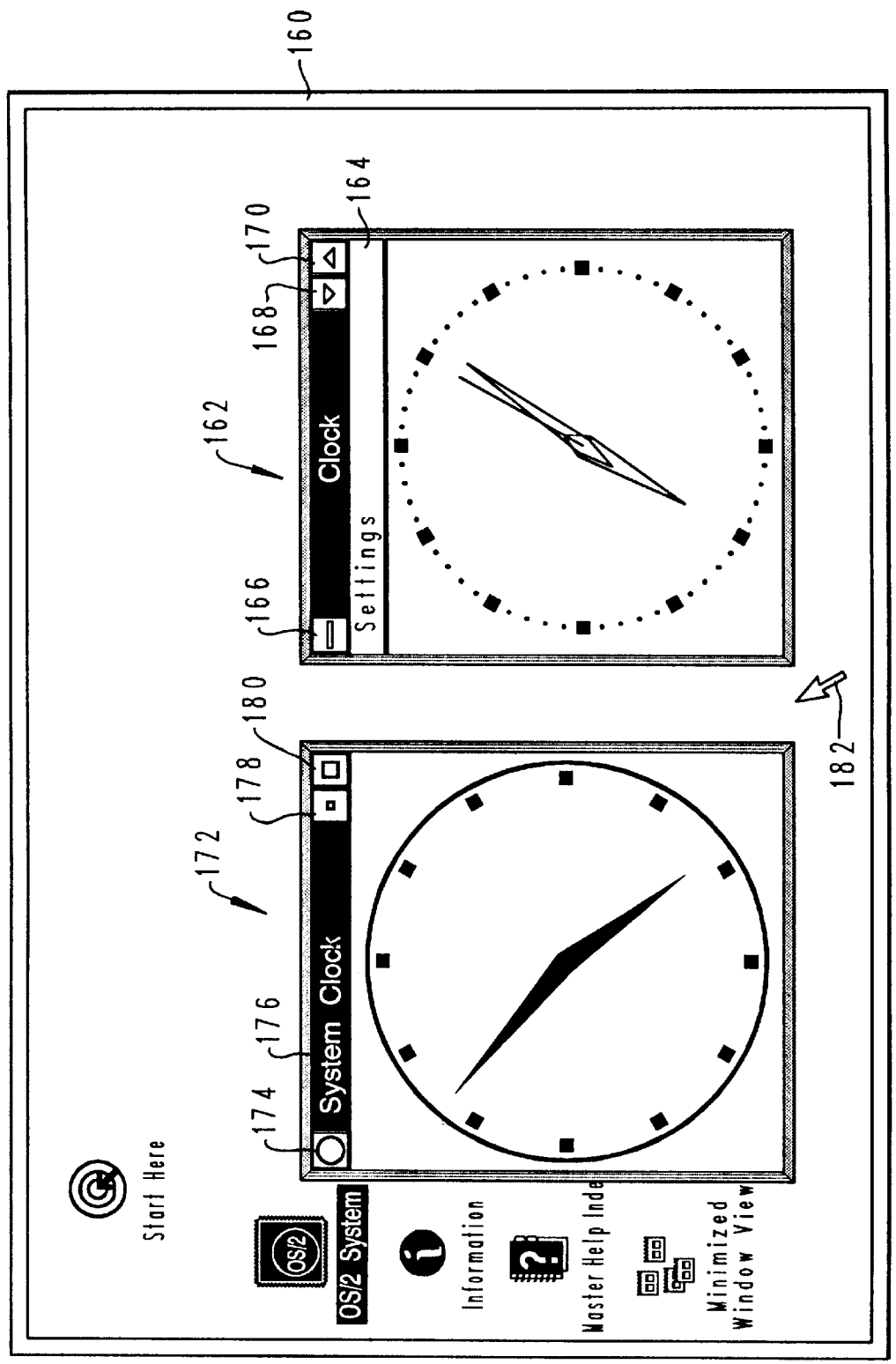
FIG. 3 is a pictorial representation of a computer display screen illustrating a presentation in accordance with the method and system of the present invention.

With reference now to FIG. 3, there is depicted a pictorial representation of a computer display screen 160 illustrating a presentation in accordance with the method and system of the present invention. As illustrated, computer display screen 160 includes two windows 162 and 172. In the depicted embodiment of FIG. 3 window 162 is preferably a Windows presentation which includes a menu bar 164, a system menu icon 166, a minimize button 168, and a maximize button 170 which will be recognizable to those skilled in the art as standard interface commands utilized by the Windows graphic user interface. Window 162 is preferably painted within computer display screen 160 by establishing a clipping region which corresponds to the area to be occupied by that window and permitting VGA device driver 132 (see FIG. 2) to manage that portion of computer display screen 160. Similarly, Presentation Manager system clock window 172 is also depicted. As illustrated, window 172 preferably includes a title bar 176, an iconic representation 174, a minimize button 178 and a maximize button 180 which will be recognizable by those skilled in the art as the standard interface commands utilized by the Presentation Manager graphic user interface. Finally, computer display screen 160 also preferably includes a cursor 182, which, in accordance with the described embodiment of the present invention, is always controlled by the Presentation Manager graphic user interface in a manner described above.

Upon reference to the foregoing those skilled in the art will appreciate that the method and system of the present invention permits multiple windows supported by different graphic user interfaces to be simultaneously presented within a computer display such that a user may advantageously utilize applications designed for maximum efficiency with a particular graphic user interface without requiring the termination of operations in a graphic user interface and the initiation of operations in a second graphic user interface. By permitting each graphic user interface to paint to a selected section of computer display screen 160 utilizing the clipping region control approach described above, diverse windows supported by different graphic user interfaces may be simultaneously displayed in a manner similar to the display of multiple windows by a single graphic user interface; however, the system interface commands specific to a particular graphic user interface may be maintained and utilized with each application which is run under that application.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system having a video display which includes a video display screen for permitting simultaneous presentation of video data objects within multiple windows which are each supported by different graphic user interfaces, said method comprising the steps of:

providing a separate video display device driver for painting a display of objects within each graphic user interface session;

coupling each of said separate video display device driers to a single virtual video display device driver;

maintaining a representation of each object displayed within all of said graphic user interface sessions within said single virtual video display deice driver;

simultaneously coupling each of said separate video display device drivers to said video display; and controlling what portion of said video display screen each of said separate video display device drivers may paint to utilizing said single virtual video display device driver.

2. The method in a data processing system for permitting simultaneous presentation of video data objects within multiple windows supported by different graphic user interfaces according to claim 1, further including the step of detecting movements of each window within said data processing system supported by each graphic user interface.

3. The method in a data processing system for permitting simultaneous presentation of video data objects within multiple windows supported by different graphic user interlaces according to claim 2, further including the step of coupling each detected movement of each window within said data processing system supported by each graphic user interface to said single virtual video display device driver.

4. The data processing system for permitting simultaneous presentation of video data objects within multiple windows supported by different graphic user interfaces according to claim 3, further including window movement detection means coupled to each graphic user interface for detecting movement of each window within said data processing system supported by each graphic user interface.

5. The data processing system for permitting simultaneous presentation of video data objects within multiple windows supported by different graphic user interfaces according to claim 4, further including means for coupling said window movement detection means to said single virtual video display device driver.

6. A data processing system having a video display including a video display screen for permitting simultaneous presentation of video data objects within multiple windows which are each supported by different graphic user interfaces, said data processing system comprising:

a plurality of video display device drivers, each of said video display device drivers for painting a display of object within an associated graphic user interface session;

means for coupling each of said separate video display device drivers to a single virtual video display device driver;

means for maintaining a representation of each object displayed within all of said graphic user interface sessions within said single virtual video display device drivers;

means for simultaneously coupling each of sad separate video display device drivers to said video display; and means for controlling what portion of said video display screen each of said separate video display device drivers may paint to utilizing said single virtual video display device driver.

\* \* \* \* \*